March 16, 1937.　　W. W. GRAEPER　　2,074,086
COLORIMETER PLUNGER
Filed Feb. 1, 1935
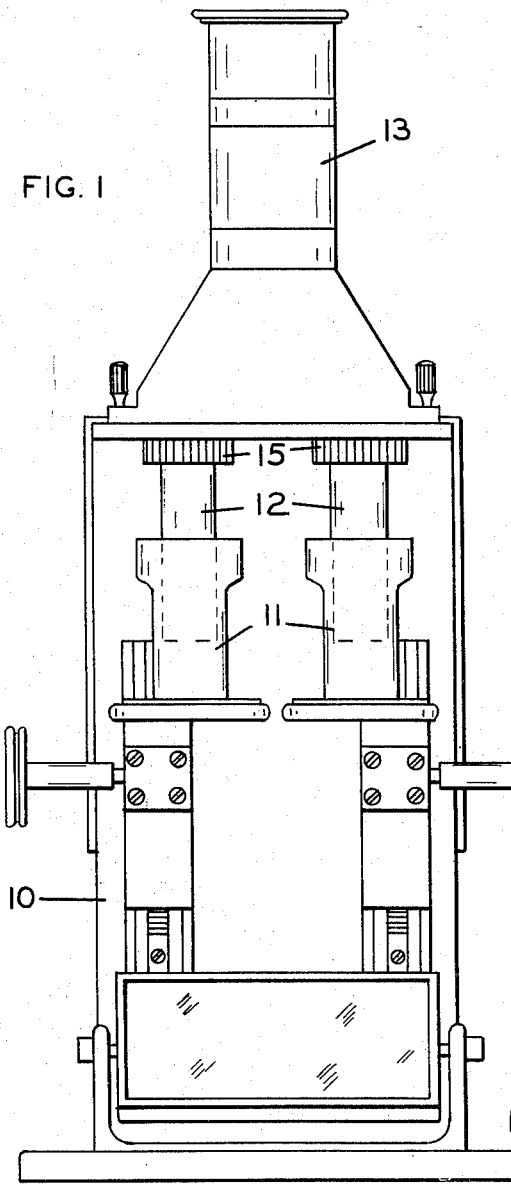
FIG. 1
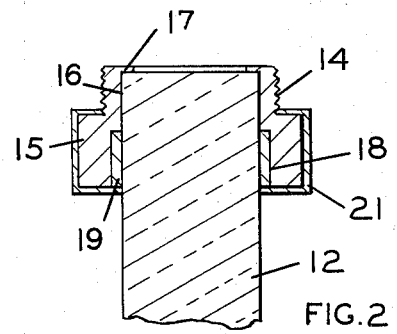
FIG. 2
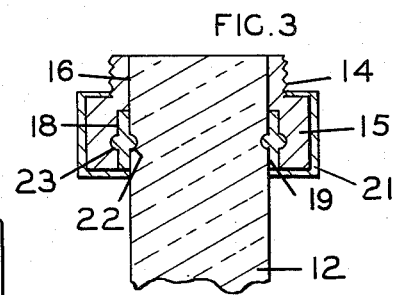
FIG. 3
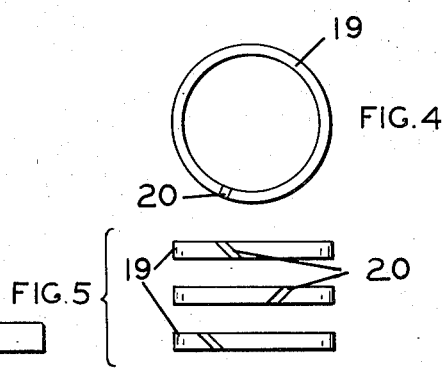
FIG. 4
FIG. 5
WALTER W. GRAEPER
INVENTOR
BY *J. H. Ellestad*
ATTORNEY Patented Mar. 16, 1937

2,074,086

UNITED STATES PATENT OFFICE 2,074,086

COLORIMETER PLUNGER

Walter W. Graeper, Rochester, N. Y., assignor to Bausch & Lomb Optical Company, Rochester, N. Y., a corporation of New York Application February 1, 1935, Serial No. 4,531

6 Claims. (Cl. 88—14)

The present invention relates to optical instruments and more particularly it has reference to means for attaching transparent optical elements to mountings.

One of the objects of this invention is to provide an improved means for securing transparent optical elements in mountings. Another object is to provide an improved means for securing transparent optical elements in metallic mountings without the use of a cementitious substance. A further object is to provide an improved means for securing colorimeter plungers in metal mountings. A still further object is to provide an improved colorimeter plunger in which the transparent plunger is secured in a metallic mount by a fusible metal and the mount and metal are plated with a non-corroding metal. These and other objects and advantages reside in certain novel features of construction, arrangement and combination of parts as will hereinafter be more fully set forth and pointed out in the appended claims.

Referring to the drawing:

Fig. 1 is a front elevation of a colorimeter embodying my invention.

Fig. 2 is an enlarged sectional view showing an application of my invention for mounting a colorimeter plunger.

Fig. 3 is an enlarged sectional view showing a modified application of my invention for mounting a colorimeter plunger.

Fig. 4 is a top plan view of a fusible ring used in securing the plunger in its mount.

Fig. 5 is an exploded view of three fusible metal rings for securing the plunger in its mount.

My invention is illustrated in the drawing wherein 10 indicates a colorimeter of a well known type having the two adjustably mounted cups 11, the two fixed plungers 12 and the usual viewing tube 13. The plunger 12, which may be of glass, quartz or any suitable transparent material, is removably secured to the stand of the colorimeter 10 by means of the threaded portion 14 on the annular member 15. The annular member 15 has a bore 16 within the threaded portion 14 for snugly receiving the end of the plunger 12, and the bore 16 terminates with an inwardly extending shoulder 17 which forms a seat for the end of the plunger 12. An undercut recess 18 is formed at the other end of the interior of the annular member 15 completely surrounding the plunger 12.

To secure the plunger 12 in the member 15, several split rings 19 of a fusible metal such as solder, are placed in the recess 18 with the openings 20 staggered as shown in Fig. 5. The metal of the rings 19 has a melting point so low that the fusing temperature will affect neither the plunger 12 nor ring 15. The plunger 12, member 15 and rings 19 are then heated until the fusible metal melts and, when the metal cools a tight frictional bond is formed between the member 15 and the plunger 12. As the member 15 and bonding material 19 are both of metal, it is easy to cover both with a plating 21 of non-corroding metal such as gold, platinum or rhodium. The resultant plunger assembly can then be used with strong acids without damage either to the member 15 or bonding material 19.

In the modification shown in Fig. 3, the member 15 has the bore 16 within the threaded portion 14 for snugly receiving the plunger 12. The plunger 12 is formed with a groove 22 in its outer surface and a similar groove 23 is formed in the undercut recess 18 in the member 15. When the fusible metal rings 19 are placed in the recess 18 and melted, the metal flows into the grooves 22 and 23 thus forming a tight joint. In this modification, the seating shoulder 17 for the end of the plunger 12 can be omitted and the threaded portion 14 cut off in the plane of the end of the plunger 12 as shown. This makes it very easy to clean the end of the plunger. As in the previous form, the member 15 and bonding metal 19 are given a plating 21 of non-corroding metal.

Obviously the plating 21 of non-corroding metal could be eliminated and a non-metallic bonding agent could be used in place of the metallic rings 19. The plating 21, however, serves not only to protect the member 15 and the bonding material, but also improves the appearance of the article. The plunger illustrated is of cylindrical form and the outer surface being somewhat rough, there is no need of grooves to create the necessary resistance to movement. My invention is not limited to this shape or condition of the plunger and if the sides of the plunger are polished or if greater resistance to movement is desired, the grooves may be necessary.

From the foregoing it is apparent that I am able to attain the objects of my invention and provide a new and improved means for securing transparent optical elements in metallic mountings and for rendering said mountings non-corrosive. Various modifications can, of course, be made without departing from the spirit of my invention or the scope of the appended claims.

I claim:

1. A colorimeter plunger assembly comprising a transparent optical element, an annular member adapted to fit snugly over one end of said element, an internal flange at one end of said member to form a seat for said element, said member being formed with an internal recess at its other end and fusible material in said recess for retaining said element in said member.

2. A colorimeter plunger assembly comprising a transparent plunger having a groove formed in its outer surface, an annular member adapted to fit over said rod, said member having a groove on its inner surface and a fusible connecting medium having a melting point lower than that of said member and said plunger extending into both grooves.

3. An article of the character described comprising a transparent plunger having a groove in its outer surface, a member adapted to fit snugly over said plunger, a recessed portion in said member opposite said groove, a groove in said recessed portion and a fusible material filling said recess and said grooves, said plunger and said member terminating in a single plane.

4. A colorimeter plunger assembly comprising a transparent plunger, an annular metallic member having an internal shoulder adapted to form a seat for said plunger, said member having an internal recess spaced from said shoulder, a fusible metal in said recess for holding said plunger in said member and a layer of non-corroding metal covering the exposed surface of said member and said metal.

5. A colorimeter plunger assembly comprising a transparent plunger having plane, parallel ends, a member adapted to fit snugly over said plunger, one end of said member being in the plane of one end of said plunger, an internal recess extending around said member at its other end, a metallic bonding element filling said recess and securing said plunger to said member and a layer of non-corroding metal covering the exposed surface of said member and said element.

6. A colorimeter plunger assembly comprising a transparent plunger member, an annular metallic member having a central opening for snugly receiving the end of said plunger member, said opening being enlarged toward the other end of said plunger, a fusible metal of the type which expands upon freezing filling the enlarged portion of said opening, and a non-corroding metal covering said metallic member and said metal.

WALTER W. GRAEPER.